(12) United States Patent
Sampino Racsko

(10) Patent No.: US 12,491,341 B2
(45) Date of Patent: Dec. 9, 2025

(54) DOUBLE NEEDLE CATHETER PLACEMENT SYSTEM

(71) Applicant: Mary Sampino Racsko, Great Neck, NY (US)

(72) Inventor: Mary Sampino Racsko, Great Neck, NY (US)

( * ) Notice: Subject to any disclaimer, the term of this patent is extended or adjusted under 35 U.S.C. 154(b) by 776 days.

(21) Appl. No.: 17/737,068

(22) Filed: May 5, 2022

(65) Prior Publication Data
US 2023/0355932 A1 Nov. 9, 2023

(51) Int. Cl.
*A61M 25/06* (2006.01)
*A61M 25/00* (2006.01)

(52) U.S. Cl.
CPC .... *A61M 25/0606* (2013.01); *A61M 25/0097* (2013.01); *A61M 25/0618* (2013.01); *A61M 25/0631* (2013.01); *A61M 25/065* (2013.01); *A61M 25/0693* (2013.01); *A61M 2025/0004* (2013.01)

(58) Field of Classification Search
CPC .......... A61M 25/0097; A61M 25/0606; A61M 25/0631; A61M 26/065; A61M 25/065
USPC .............................. 604/164.09, 164.1, 164.11
See application file for complete search history.

(56) References Cited

U.S. PATENT DOCUMENTS

| | | | |
|---|---|---|---|
| 3,345,443 A * | 10/1967 | Ziegler | B01J 2/14 264/117 |
| 3,739,778 A * | 6/1973 | Monestere, Jr. | A61M 25/0111 604/167.01 |
| 5,176,659 A | 1/1993 | Mancini | |
| 5,782,505 A | 7/1998 | Brooks et al. | |
| 6,007,519 A * | 12/1999 | Rosselli | A61M 25/0606 604/164.01 |
| 6,699,221 B2 | 3/2004 | Vaillancourt | |
| 7,442,187 B2 | 10/2008 | Khayal et al. | |
| 2006/0178635 A1 * | 8/2006 | Callaway | A61M 25/0606 604/506 |

(Continued)

FOREIGN PATENT DOCUMENTS

WO WO-9839039 A1 * 9/1998 ......... A61B 17/3417

OTHER PUBLICATIONS

PCT—International Preliminary Report on Patentability (with Notification) of International Application No. PCT/US23/19328, Dated Jul. 19, 2023.

(Continued)

*Primary Examiner* — Philip E Stimpert
(74) *Attorney, Agent, or Firm* — Collard & Roe, P.C.

(57) ABSTRACT

A catheter positioning system has an inner needle assembly, an outer needle assembly and a catheter assembly. The inner needle assembly has an inner needle, a stopper connected the inner needle, and a tube connected to the stopper. The outer needle assembly has an outer needle connected to a chamber. The outer needle is arranged concentrically with the inner needle so as to surround the inner needle. The catheter assembly has an internal catheter and an access hub. The catheter is arranged concentrically over the outer needle. The catheter is placed in a vein by piercing the vein with the inner needle, infusing liquid through the tube and inner needle to inflate the vein, sliding the outer needle into the vein over the inner needle, sliding the catheter into the vein over the outer needle, and then removing the first and second needles together, leaving the catheter in the vein.

10 Claims, 4 Drawing Sheets

(56) References Cited

U.S. PATENT DOCUMENTS

2007/0260193 A1* 11/2007 Chin .................... A61B 5/1433
                                                    604/198
2009/0209912 A1    8/2009 Keyser et al.

OTHER PUBLICATIONS

Notification of the Transmittal of the International Search Report and the Written Opinion of the International Searching Authority, or the Declaration in PCT/US23/19328 dated Jul. 19, 2023.

* cited by examiner

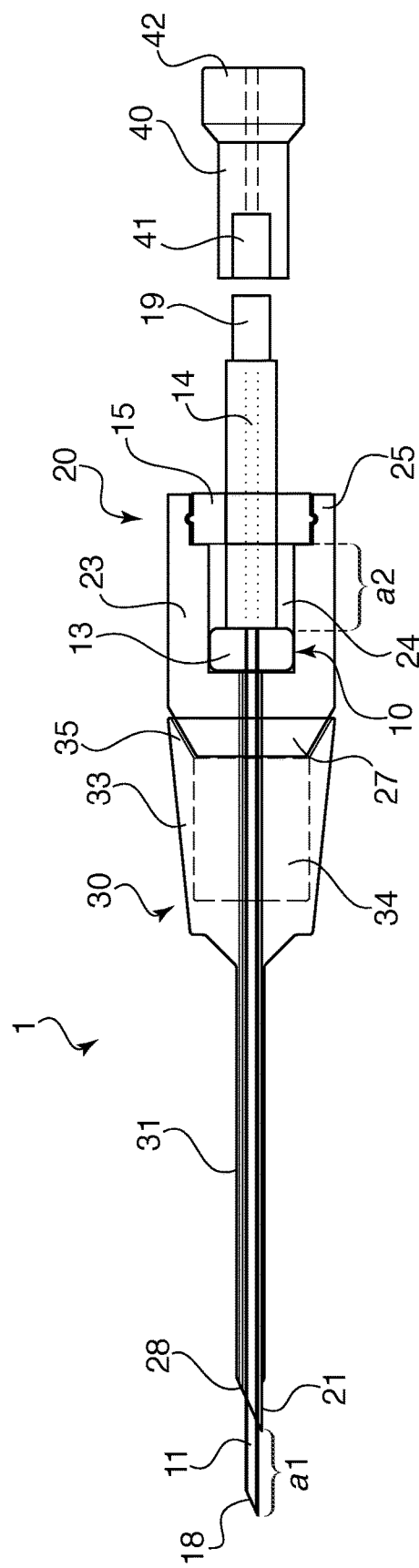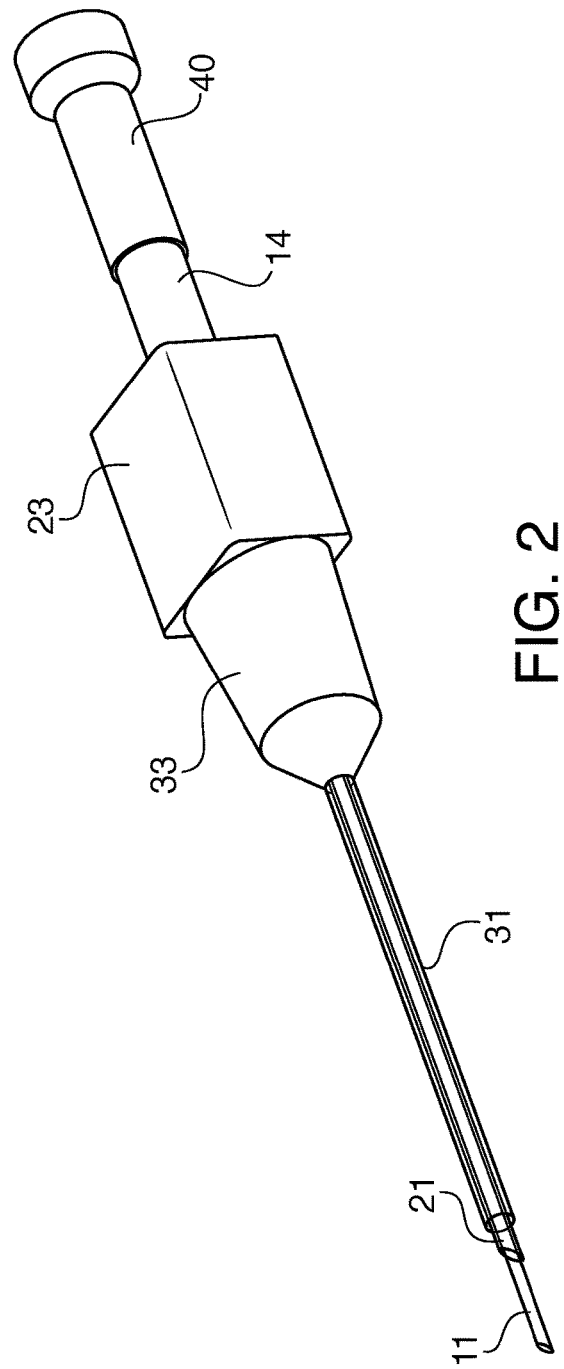

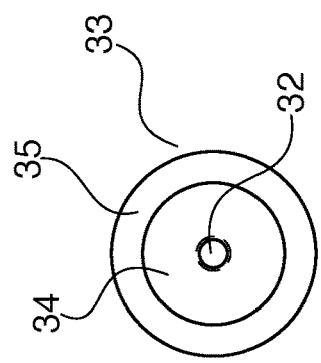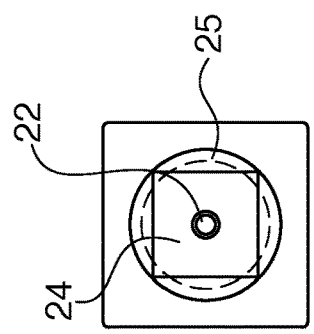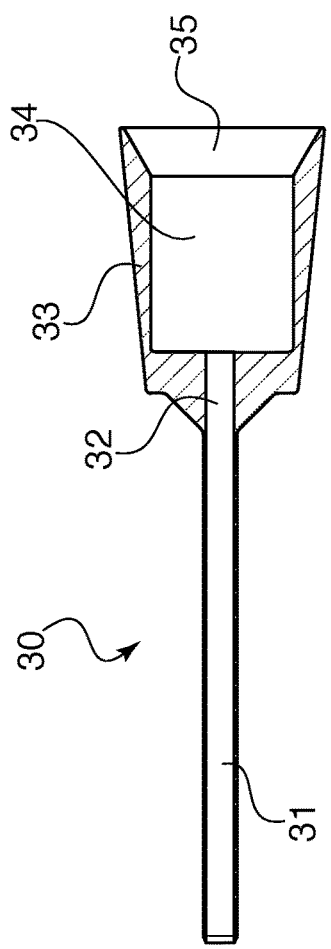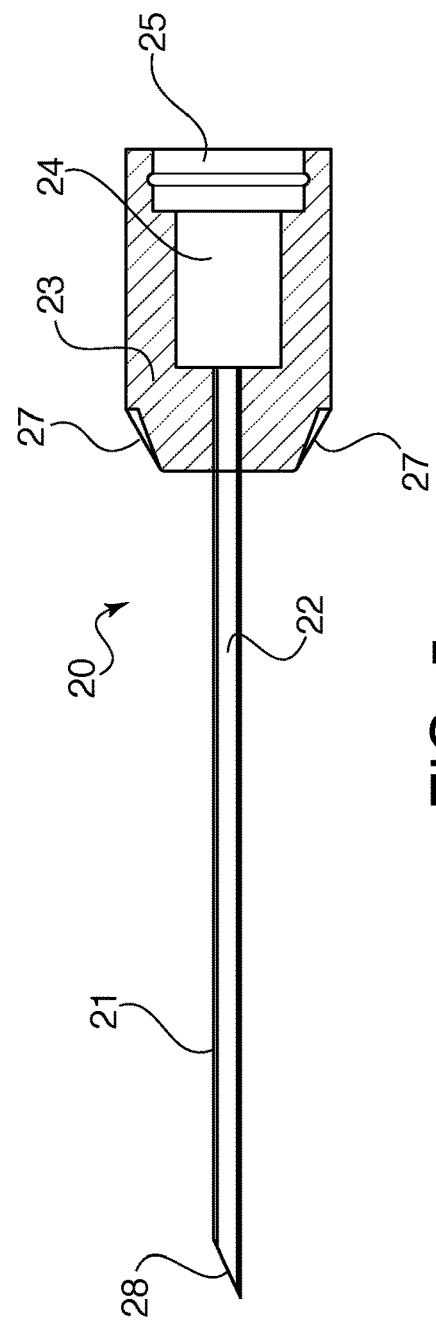

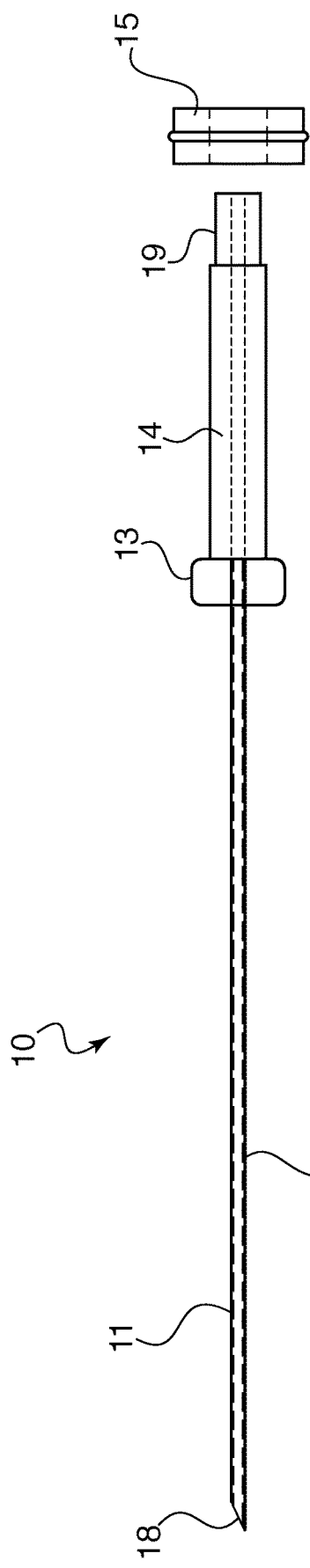
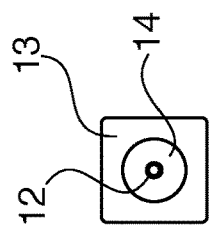

DOUBLE NEEDLE CATHETER PLACEMENT SYSTEM

BACKGROUND OF THE INVENTION

1. Field of the Invention

This invention is related to a catheter placement system that facilitates intravenous access with a large bore needle and catheter for administration of blood products. In particular, the invention relates to an assembly that comprises two concentric needles slidably arranged with respect to each other, so that the outer needle can be inserted into the vein over the inner needle in one procedure, for placement of a catheter.

2. The Prior Art

A catheter of at least 18 gauge, and preferably 16 gauge, is required to administer blood products. Inserting a needle and catheter of that dimension can be very difficult in someone who is hypovolemic due to blood loss or dehydration, as is often the case for people who require transfusion. Normally in IV catheter placement, once a vein is punctured by a needle, the catheter is slid into position through that opening in the vein and left in place and thus will prevent further seepage while the access is maintained. If no catheter is placed, or if multiple punctures are made in the vein, the vein is "blown" and leaking and cannot be used for access.

In cases of hemorrhage or severe dehydration and anemia, rapid intravenous access with a large bore needle is crucial to begin transfusion. Delays in access can be fatal. Nurses and EMT's are often the first line, at the bedside or in the field, attempting access and initiating transfusion. When they cannot access a vein with an appropriately sized catheter, trauma teams or anesthesiologists need to be summoned for additional attempts and/or central vein and/or osseous (bone line) access.

It would be desirable to formulate a catheter placement system that is simple to use and effective even in hypovolemic patients.

SUMMARY OF THE INVENTION

It is therefore an object of the invention to provide a catheter placement system that affords rapid greater ease and success of access to front line workers. The system consists of an inner needle assembly, and outer needle assembly that surrounds the inner needle, and the catheter assembly that surrounds the outer needle.

The inner needle assembly is formed by an inner needle having a central lumen, a distal end and a proximal end, a stopper connected to the proximal end of the inner needle, and a tube connected to the stopper. The tube has a cavity in communication with the lumen of the inner needle. The inner needle preferably is 20-22 gauge, but other sizes could also be used. As used herein, "proximal" shall refer to the end of the device or its components that are facing the clinician, and "distal" shall refer to the end of the device or any of its components that are facing the patient. In this case, the proximal end of the inner needle terminates at the stopper, and the stopper is fixed/connected to a transparent hollow tube.

The outer needle assembly is formed by an outer needle having a proximal end, a distal end, and a central lumen, and a chamber with a reception cavity connected to the proximal end of the outer needle. The outer needle is configured to be arranged concentrically with the inner needle so as to surround the inner needle. The outer needle has a size of approximately 16-18 gauge. The reception cavity is sized so as to receive the stopper of the inner needle assembly and the tube when the outer needle surrounds the inner needle.

The catheter assembly is intended as a standard intravenous catheter design with a hollow flexible tube of 16-18 gauge connected to an external hub that functions as a port with a receiving space therein at the proximal end. The catheter assembly is formed by an internal catheter with a central lumen, a proximal end and a distal end, and an external access hub having a receiving space therein. The catheter which has a size of between 16-18 gauge, can be placed concentrically over the outer needle. The catheter placement system of the invention can be used to place the catheter in a vein, by piercing the vein with the inner needle, infusing liquid through the tube and inner needle to inflate the vein, sliding the outer needle into the vein over the inner needle, sliding the catheter into the vein over the outer needle, and then removing the first and second needles together, leaving the catheter in the vein.

In order to prevent rotation of the needles with respect to each other, the stopper of the first needle assembly is in the shape of a polygon and the reception cavity of the second needle assembly has a shape that corresponds to the stopper of the first needle assembly, so that when the stopper is disposed in the reception cavity, the first, inner needle assembly cannot rotate relative to the second, outer needle assembly. This is important, because the needles each have beveled distal ends, and the bevels must be aligned during use. The system is constructed so that the polygonal stopper fits within the polygonal reception cavity in an orientation such that alignment of the bevels in the same direction is guaranteed, and slipping or rotation is reliably prevented. The stopper and reception cavity preferably have a square cross-section, but other shapes, such as triangular, hexagonal or other shapes could also be used. To assist with placement, the bevel of the inner needle faces the same direction as the roof of the stopper, which can be marked accordingly. Once the inner needle and stopper are inserted into the chamber during manufacturing/assembly, the stopper can slide back and forth within the chamber, but cannot rotate, as one square cannot rotate within the other.

To assist with positioning of the catheter in the assembly, the external access hub of the catheter assembly has an internal receiving bevel configured for receiving an end of the chamber of the outer needle assembly when the catheter assembly is arranged on the second needle assembly. The receiving bevel is circular and beveled in an axial direction, and wherein the end of the chamber of the outer needle assembly is correspondingly circular and beveled, so that the side walls of the external access hub sit flush with the chamber of the outer needle assembly when the end of the chamber is placed in the receiving flange.

In use, once the tip of the inner needle accesses the vein, blood will enter the lumen of the inner needle and travel up the needle and into the transparent tube within the transparent chamber so a "flash" can be seen in the chamber and venous access is verified. A "flash" is the phlebotomy terminology used to describe the blood return seen when the vein is entered by the tip of a needle. The chamber cap has a hole large enough for the hollow tube (that is connected to the inner stopper and inner needle) to pass. This cap is larger than the inner opening/chamber of the rectangular prism chamber, fitting snugly within the distal chamber endcap opening so as to be fixed in place. The hole in the cap allows the inner needle and tube to slide back and forth relative to the outer needle and chamber with the tube passing through the hole in the chamber end cap, but the stopper attached to the inner needle is unable to pass beyond the cap. In one embodiment, the chamber end cap is cylindrical and the proximal end of the chamber has cylindrical side walls that receive the end cap with friction fit.

A syringe port can be connected to the tube of the inner needle to allow for injection of sterile fluid through the inner needle to inflate the vein prior to insertion of the outer needle. Standard catheter insertion devices are not designed with access to the lumen of the needle, so normally one would need to insert the catheter and withdraw the needle prior to having access to the vein. With this system, by accessing the lumen of the narrow needle, one can infuse fluid to inflate the vein before advancing a catheter. Preferably, a standard syringe receiving port is connected to the tube via correspondingly disposed screw threads on the syringe receiving port and on the tube. The design of the catheter itself is not intended to deviate from the standard catheter design, and the device according to the invention is intended for use with standard catheters.

Once, or as, the vein is inflated by infusing fluid through the inner needle using the syringe with the tourniquet remaining in place to inflate the vein, and then the larger outer needle with the catheter can slide down over the inner needle, which is already in position puncturing the vein. The system is designed to maintain the two needles in the same position without rotation so that the bevels of the inner and outer needles are aligned in the same direction. It is also designed to stop the tip of the outer needle from passing beyond the tip of the inner needle, so as to not pass through and puncture the vein on the other side of the insertion. Once the tip of the outer needle reaches the tip of the inner needle, the catheter can slide down and into the vein as usual and the two needles are then withdrawn from within the catheter.

The distance from the point of the tip of the inner needle to the point of the tip of the outer needle when the inner needle is fully deployed/extended should be the same distance from the proximal side of the inner stopper to the distal side of the outer cap (where proximal and distal are in relation to the clinician) so that when the inner needle is fully retracted, the inner stopper abuts the outer cap at the distal end of the chamber and prevents any further extension of the outer needle beyond the tip of the inner needle.

The length of the inner needle is greater than the outer needle so that the full bevel of the inner needle will extend beyond the tip of the outer needle and can be repositioned and advanced slightly before the outer needle punctures the vein. The length of the higher gauge inner needle also exceeds the length of the outer needle in that it must pass through the inner stopper to stabilize the needle until it terminates at the transparent "tube which is fixed to the stopper.

The catheter is positioned on the outer needle so that the tip of the catheter ends at the proximal apex of the bevel on the outer needle. The design of the outer needle and catheter are consistent with existing catheter design with the exception that the proximal end of the needle terminates in the rectangular prism chamber as described above.

The arrangement of the inner needle, outer need and catheter provides an efficient and simple way to insert a catheter in a vein, without needing multiple pieces of equipment or multiple steps.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a cross-sectional view of the catheter placement assembly according to the invention;

FIG. 2 shows a perspective view of the assembled catheter placement assembly;

FIG. 3 shows a cross-sectional view of the catheter;

FIG. 4 shows a proximal end view of the catheter;

FIG. 5 shows a cross-sectional view of the outer needle assembly;

FIG. 6 shows a proximal end view of the outer needle assembly;

FIG. 7 shows a cross-sectional view of the inner needle assembly and end cap;\

FIG. 7A shows a side view of the chamber end cap;

FIG. 8 shows an end view of the inner needle assembly;

FIG. 9 shows an end view of the end cap; and

DETAILED DESCRIPTION OF THE PREFERRED EMBODIMENT

Figure 10:
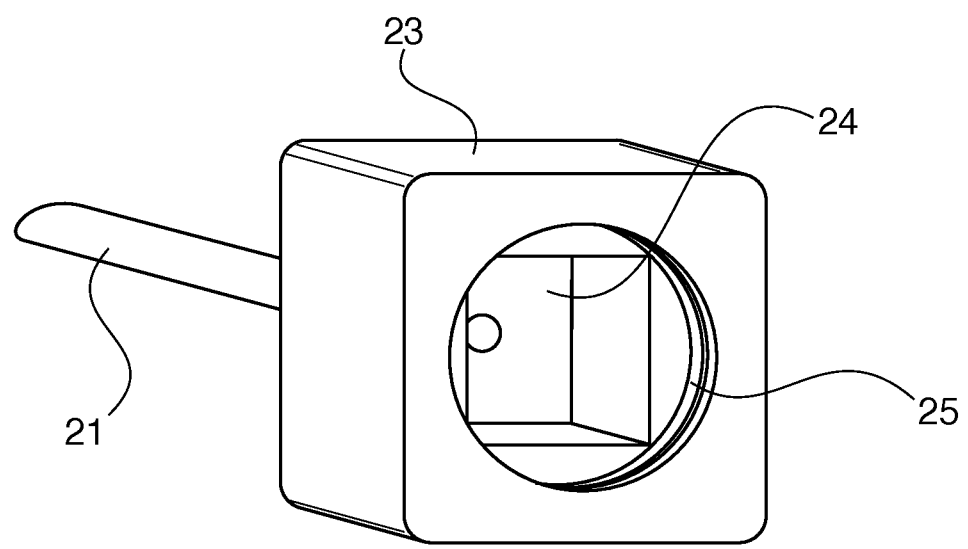
FIG. 10 shows a perspective view of the chamber of the outer needle assembly.

Referring now in detail to the drawings, FIG. 1-2 shows the catheter placement assembly 1 according to the invention, in a cross-sectional view in FIG. 1 and in a perspective view in FIG. 2. The catheter placement assembly 1 comprises an inner needle assembly 10, an outer needle assembly 20, and a catheter assembly 30. The three components 10, 20, 30 are connected together as shown to form the catheter placement assembly 1. Catheter assembly 30 is shown in FIGS. 3 and 4. Catheter assembly 30 is formed of a catheter 31 having a lumen 32 and an external access hub 33 with a receiving space 34. A circular internal bevel 35 surrounds the interior top portion of the receiving space 34.

FIGS. 5 and 6 show the outer needle assembly 20, in cross-sectional and end views. Outer needle assembly 20 comprises an outer needle 21 with a central lumen 22, a beveled tip 28 and a transparent chamber 23 with a reception cavity 24 connected to the proximal end of the outer needle 21. An enlarged receiving area 25 is disposed at the proximal end of chamber 23. The cross-section of cavity 24 is square, while the enlarged receiving area 25 has a round cross-section, as shown in FIG. 6. Chamber 23 has a distal end with a circular bevel 27 to which the catheter would anchor.

Inner needle assembly 10 is shown in FIGS. 7-9. Inner needle assembly 10 is formed of an inner needle 11 having a beveled tip 18, a central lumen 12, a square stopper 13 connected to the proximal end of inner needle 11, and a transparent tube 14 connected to inner needle 11 so that lumen 12 is in communication with the interior of tube 14. A chamber end cap 15 shown in FIG. 7A has a central aperture 16 that is slidable along tube 14 to connect inner needle assembly 10 to outer needle assembly 20 as will be described below. The end of tube 14 is equipped with a plug connection 19 for connection to a syringe receiving port 14 via recess 41, as shown in FIG. 1.

Returning to FIG. 1, the assembly is connected as follows: Inner needle 11 is fed through outer needle 21 until stopper 13 abuts the distal end of chamber 23. Stopper 15 can then be seated in receiving area 25 to secure tube 14 to chamber 23. Outer needle 21 is then placed through catheter 31 until bevel 27 is seated in internal bevel 35, so that the entire assembly is connected as a unit. Syringe port 40 has plug portion 41 that inserts into plug 19 of tube 14, to allow syringe access to inner needle 11. Other attachment methods, such as screw threads or latches could also be used. In an extended position, inner needle 11 extends beyond outer needle 21 by a distance $a_1$, which is equal to the distance $a_2$ from the proximal end of stopper 13 to the distal end of chamber end cap 15. Outer needle 20 can be deployed by pushing chamber 23 distally until the distal ends 18, 28 of inner needle 11 and outer needle 20 are equally spaced from catheter access port 33. Stopper 13 prevents deployment of outer needle 21 beyond the tip 18 of inner needle 11, to prevent perforation of any veins by outer needle 21.

As can be seen in FIGS. 1 and 2, the beveled tips 18, 28 are held in a same alignment during use, so that the openings face the same direction. This is possible due to the orientation of stopper 13 in chamber 24, as both stopper 13 and cavity 24 have a square cross-section. This means that inner needle 11 and outer needle 21 cannot rotate with respect to each other when stopper 13 is disposed in cavity 24.

FIG. 10 shows a view of the chamber 23 according to the invention. As can be seen, chamber 23 has a receiving area 25 at its distal end for chamber end cap 15. Extending distally, cavity 24 has a square shape, with side walls 241, 242 for receiving square stopper 13 of inner needle assembly 10. The specific geometry of inner needle assembly 10 and outer needle assembly 20 ensures proper orientation of the needles as well as efficient relative linear movement of the needles during insertion into the vein.

Accordingly, while only a few embodiments of the present invention have been shown and described, it is obvious that many changes and modifications may be made thereunto without departing from the spirit and scope of the invention.

What is claimed is:

1. A catheter placement system comprising:
   an inner needle assembly comprising an inner needle having a central lumen, a distal end and a proximal end, a stopper connected to the proximal end of the inner needle, and a tube connected to the stopper, the tube having a cavity in communication with the lumen of the inner needle, and
   an outer needle assembly comprising an outer needle having a proximal end, a distal end, and a central lumen, and a chamber with a reception cavity connected to the proximal end of the outer needle, wherein the outer needle is configured to be arranged concentrically with the inner needle so as to surround the inner needle and is slidable over the inner needle, and a chamber end cap that is configured to fit within a proximal end of the reception cavity, the chamber end cap having a central opening through which the tube of the inner needle assembly extends, wherein the reception cavity is sized so as to receive the stopper of the inner needle assembly when the outer needle surrounds the inner needle such that the stopper abuts a distal end of the reception cavity when the inner needle is in an extended position, and slides within the reception cavity to abut the chamber end cap when the outer needle is slid over the inner needle,
   wherein the catheter placement system is configured to insert an internal catheter into a vein by piercing the vein with the inner needle, infusing liquid through the inner needle to inflate the vein, sliding the outer needle into the vein over the inner needle, sliding the internal catheter into the vein over the outer needle, and then removing the inner and outer needles together, leaving the internal catheter in the vein, and
   wherein a distance from a tip of the inner needle to a tip of the outer needle when the inner needle is fully extended equals a distance from a proximal side of the inner stopper to a distal side of the chamber end cap, so that the outer needle assembly cannot extend beyond the distal end of the inner needle.

2. The catheter placement system according to claim 1, further comprising a catheter assembly comprising the internal catheter with a central lumen, a proximal end and a distal end, and an external access hub having a receiving space therein, the catheter being configured to be placed concentrically over the outer needle.

3. The catheter placement system according to claim 1, wherein the stopper of the inner needle assembly is in the shape of a polygon, and the reception cavity of the outer needle assembly has a shape that corresponds to the stopper of the inner needle assembly, so that when the stopper is disposed in the reception cavity, the inner needle assembly cannot rotate relative to the outer needle assembly.

4. The catheter placement system according to claim 2, wherein the external access hub has an internal bevel configured for receiving an end of the chamber of the outer needle assembly when the catheter assembly is arranged on the second needle assembly.

5. The catheter placement system according to claim 4, wherein the internal bevel is circular and beveled in an axial direction, and wherein the end of the chamber of the outer needle assembly is correspondingly circular and beveled, so that the external access hub sits flush with the chamber of the outer needle assembly when the end of the chamber is placed in the internal bevel.

6. The catheter placement system according to claim 1, wherein the chamber end cap is cylindrical and wherein the proximal end of the chamber has cylindrical side walls that receive the end cap with friction fit.

7. The catheter placement system according to claim 1, further comprising a syringe receiving port configured to be connected the tube, so that fluid from the syringe can be transferred to the tube and through the inner needle.

8. The catheter placement system according to claim 7, wherein the syringe receiving port is connected to the tube via a plug connection.

9. The catheter placement system according to claim 1, wherein when the stopper of the inner needle assembly is disposed in the chamber of the outer needle assembly, the distal end of the outer needle cannot extend beyond the distal end of the inner needle.

10. The catheter placement system according to claim 1, wherein the distal ends of the inner needle and outer needle are beveled, and wherein the stopper and chamber are shaped such that when the stopper is disposed in the chamber, the bevels of the inner and outer needle are aligned facing a same direction.

* * * * *